United States Patent [19]

Yajima et al.

[11] Patent Number: 4,916,426
[45] Date of Patent: Apr. 10, 1990

[54] PRESSURE SENSOR

[75] Inventors: Yasuhito Yajima; Kazuyoshi Shibata, both of Nagoya; Syunzo Mase, Aichi, all of Japan

[73] Assignee: NGK Insulators, Ltd., Nagoya, Japan

[21] Appl. No.: 234,571

[22] Filed: Aug. 22, 1988

[30] Foreign Application Priority Data

Aug. 28, 1987 [JP] Japan ............... 62-132204[U]

[51] Int. Cl.$^4$ .............................................. G01L 1/22
[52] U.S. Cl. .......................................... 338/4; 338/42
[58] Field of Search ................... 338/4, 36, 5, 42; 73/725–727, 862.65

[56] References Cited

U.S. PATENT DOCUMENTS

| | | | |
|---|---|---|---|
| 4,068,206 | 1/1978 | Popp | 338/36 |
| 4,311,980 | 1/1982 | Prudenziati | 338/4 |
| 4,431,981 | 2/1984 | Fuller et al. | 338/36 X |

OTHER PUBLICATIONS

SAE Paper No. 860474 "High Pressure Thick Film Monolithic Sensors", by Roberto Dell'Acqua and Giuseppe Dell'Orto–Mar. 20, 1986.

*Primary Examiner*—Bruce A. Reynolds
*Assistant Examiner*—Marvin M. Lateef
*Attorney, Agent, or Firm*—Arnold, White & Durkee

[57] ABSTRACT

A pressure sensor having a ceramic pressure sensing element including a bottom wall serving as a diaphragm, and a tubular wall which extends from a periphery of the bottom wall and cooperates with the bottom wall to define a cavity. The diaphragm has resistors formed thereon. The resistors are electrically connected to an external electric device by electrically conductive members. The sensing element is held in a housing by a retainer member such that one end of the retainer member is aligned with an end face of the tubular wall remote from the bottom wall. A biasing member is provided for biasing the retainer member toward the ceramic pressure sensing element, to exert a retaining force to the sensing element.

23 Claims, 5 Drawing Sheets

PRESSURE SENSOR

BACKGROUND OF THE INVENTION

1. Field of the Invention

The present invention relates generally to a ceramic pressure sensor, and more particularly to a ceramic pressure sensor which has a ceramic diaphragm which is deformed in response to a pressure applied thereto, and at least one resistor whose resistance value varies according to a magnitude of deformation of the diaphragm and represents the pressure applied to the diaphragm.

2. Discussion of the Prior Art

U.S. Pat. No. 4,311,980 discloses a sensing device utilizing resistor strain gages, for measuring pressure in a combustion chamber of an internal combustion engine of a motor vehicle, or pressure in a hydraulic device or other devices or systems. This pressure sensing device uses a pressure sensing element made of a ceramic material. The ceramic sensing element includes a diaphragm portion on which a thick-film resistor circuit is formed. Generally, the ceramic pressure sensing element has a comparatively high resistance to heat, and is less likely to be affected by the temperature of a subject fluid whose pressure is to be measured. Further, the ceramic pressure sensing element has a comparatively small pressure hysteresis. Thus, the ceramic pressure sensing element assures a high degree of sensing accuracy.

Another type of pressure sensing device utilizing such an excellent ceramic pressure sensing element is shown in SAE Paper No. 860474 (1986). Described more specifically by reference to FIG. 10, a ceramic pressure sensing element 2 includes a diaphragm portion 21 having resistors (not shown) formed thereon, and a ceramic capsule 10 which is bonded to the diaphragm portion 21 by a glass sealing member 11. The sensing element 2 is held in position by an upper metal block 12 and a lower metal block 13 which has a pressure hole 14 for directing a subject fluid to the diaphragm portion 21. The sensing element 2 is sandwiched between the upper and lower blocks 12, 13 such that an O-ring 15 interposed between the lower block 13 and the diaphragm portion 21 urges the sensing element 2 against the end face of the upper block 12.

The upper and lower blocks 12, 13 are held together by a metal housing 4 such that the metal housing 4 engages the outer circumferential portions of the blocks 2, 13. An electronic circuit 16 is formed on a surface of the ceramic capsule 10 remote from the diaphragm portion 21. Lead wires 9 are connected at their one end to the electronic circuit 16, for applying power to the resistors on the diaphragm portion and feeding an output signal of the circuit 16 to an external device. The wires 9 extend through the block 12 so that the other ends of the wires are connected to the external device.

In the known pressure sensor constructed as described above, the pressure sensing element is held in position in pressed contact with the two blocks 12, 13 which are held together by the metal housing 4, there may arise thermal stresses due to a difference in coefficient of thermal expansion between the ceramic material of the sensing element and the metallic materials of the housing and blocks 4, 12, 13, where the sensing element is used to measure the pressure of a high-temperature fluid such as a gas within a combustion chamber of an internal combustion engine. In the known arrangement, no provisions are made for solving this problem of thermal stresses.

Another problem encountered on the known pressure sensor arises from the manner in which the diaphragm portion is exposed to the subject fluid, when the fluid contains a corrosive substance or soot, like combustion gases emitted by an internal combustion engine. That is, the soot is likely to plug the pressure hole, or be accumulated on the sensing element. Further, the pressure hole undergoes resonance upon transient changes in the pressure therein, whereby the diaphragm portion cannot be displaced or deformed exactly in response to the change in the pressure, leading to inaccurate measurement of the pressure of the subject fluid.

In the same known pressure sensor, the lead wires are directly connected to the ceramic pressure sensing element, to apply power to the resistors and feed the output signal to the external device. When the pressure sensor is installed at a location subject to vibrations, for example, on a motor vehicle, the lead wires tend to become disconnected from the sensing element, damaged, or become subjected to short-circuiting with each other or other members of the sensor such as the metal housing.

Further, the output signals in the form of a voltage or current signal indicative of a change in the electrical resistance values of the resistors responsive to a change in the pressure of the subject fluid should be fed from the diaphragm portion to the electronic circuit and then to the external device. The signal lines extending from the diaphragm portion should be insulated by a suitable insulating member such as a glass layer. The use of the insulating member reduces the freedom of design of the pressure sensor.

As indicated above, a ceramic pressure sensing element when applied to detect pressure at a location under severe conditions, such as pressure in a combustion chamber of an internal combustion engine, the sensing element should be designed to cope with a high temperature of the fluid, a high rate of change in the pressure, and a large magnitude of vibrations.

SUMMARY OF THE INVENTION

It is therefore an object of the present invention to provide a pressure sensor having a ceramic pressure sensing element, which sensor has provisions for dealing with thermal stresses due to a difference in coefficient of thermal expansion between ceramic and metallic materials of the components.

The above object may be achieved according to the principle of the present invention, which provides a pressure sensor comprising: (a) a ceramic pressure sensing element including a bottom wall serving as a diaphragm, and a tubular wall which extends from a periphery of the bottom wall and cooperates with the bottom wall to define a cavity, the diaphragm having at least one resistor formed thereon; (b) electrically conductive means electrically connected to the ceramic pressure sensing element; (c) a retainer member for holding the ceramic pressure sensing element such that one end of the retainer member is aligned with an end face of the tubular wall remote from the bottom wall; (d) a housing accommodating the ceramic pressure sensing element and the retainer member; and (e) biasing means associated with the other end of the retainer member, for biasing the retainer member toward the ceramic pressure sensing element, to exert a retaining force to the sensing element.

In the pressure sensor of the present invention constructed as described above, the ceramic pressure sensing element is held in position in the housing such that the sensing element is urged against an appropriate portion of the housing by the biasing force of the biasing means, which is imparted to the sensing element via the retainer member. Further, thermal stresses due to differences in coefficient of thermal expansion between the housing and the retainer member and between the housing and the ceramic pressure sensing element may be absorbed by displacements of the retainer member and the sensing element within the housing in the biasing direction of the biasing means or in the opposite direction against the biasing force. This arrangement permits accurate and reliable measurement of a pressure of a subject fluid, even when the fluid has a considerably high temperature.

The diaphragm portion of the sensing element may have a plurality of resistors which are connected in a bridge configuration, for example, in a Wheatstone bridge circuit. The resistor or resistors may be formed on an inner surface of the bottom wall which partially defines the cavity. Alternatively, the resistor or resistors may be formed on an outer surface of the bottom wall.

The biasing means may be a coil spring, for example, and may be disposed within a cap which is fixed at one end thereof to the housing. The pressure sensor may further comprise a socket disposed in the cap, between the retainer member and the biasing means. In this case, a biasing force of the biasing means is transmitted to the pressure sensing element via the socket and the retainer member.

Another object of the invention is to provide a pressure sensor having a ceramic pressure sensing element to which a subject fluid is applied without passing through a pressure hole as provided in the known sensor.

The above object may be attained according to one form of the present invention, wherein the pressure sensing element is disposed in one of opposite longitudinal end portions of the housing such that an outer surface of the bottom wall remote from the cavity is exposed to the fluid.

The same object may be attained according to another form of the invention, wherein the sensing element is also disposed in one of opposite longitudinal end portions of the housing. This one longitudinal end portion having an end wall which is exposed to the fluid. The bottom wall serving as the diaphragm is positioned relative to the end wall of the housing such that the bottom wall is displaceable together with the end wall in response to a change in a pressure of the fluid. The bottom wall may be held in contact with the end wall of the housing. Alternatively, a transmission member is interposed between the bottom wall of the pressure sensing element and the end wall of the housing, so that the transmission member transmits a displacement of the end wall to the bottom wall as the diaphragm.

In the above forms of the present invention, the diaphragm or the bottom wall of the sensing element is exposed directly or indirectly exposed to the fluid, without passing through a pressure hole. Therefore, the pressure sensor does not suffer from the conventionally experienced plugging of the pressure hole with soot or other substances contained in the fluid, or resonance of the pressure hole due to a transient change of the pressure of the fluid. Accordingly, the instant pressure sensor is sufficiently sensitive to a change in the fluid pressure, and is free from a sensing error which would arise from lowering of the fluid pressure due to plugging of the pressure hole, or from the resonance of the pressure hole.

A further object of the invention is to provide a pressure sensor having a ceramic pressure sensing element, which is free from the conventionally experienced electrical wiring trouble due to vibrations of the sensor.

The above object may be accomplished according to a further form of the invention, wherein the electrically conductive means comprises electrically conductive members which are formed on the retainer member and electrically connected to the at least one resistor.

In the above form of the invention, the resistor or resistors may be electrically connected to the electrically conductive members formed on the retainer member, such that one end of each conductive member is in pressed contact with the corresponding resistor, under the biasing force of the biasing means. Accordingly, the electrically conductive members are not disconnected from the resistors even when the pressure sensor is subject to vibrations, or even when the components of the sensor are subject to thermal stresses due to different thermal expansion coefficients. Thus, the instant pressure sensor permits improved measuring accuracy even under severe operating conditions.

The retainer member may be a columnar body. In this case, the electrically conductive members may be provided in the form of strips which are formed on an outer circumferential surface of the columnar body such that the strips extend in a longitudinal direction of the columnar body. The conductive strips are preferably covered by an insulating layer.

Alternatively, the retainer member has through-holes formed therethrough in a longitudinal direction, and the through-holes are filled with an electrically conductive material. In this case, the masses of the electrically conductive material filling the through-holes constitute the electrically conductive members.

In a further alternative arrangement of the same form of the invention, the retainer member is a tubular member having a bore formed therein, and the electrically conductive members are formed on an inner circumferential surface which defines the bore.

The electrically conductive means may further comprise electrically conductive paths formed through the tubular wall, and/or electrode means electrically connected to the respective resistors. For instance, each resistor is electrically connected to the corresponding electrode, which in turn is electrically connected to the corresponding electrically conductive member formed on the retainer member. The electrically conductive member may be connected to a suitable external device through a suitable lead wire.

An insulating ring may be interposed between the pressure sensing element and the above-indicated one end of the retainer member. In this case, the electrically conductive means further comprises metal pieces which are fixed on the insulating ring and which are electrically connected to the at least one resistor.

According to still a further form of the pressure sensor of the present invention, the pressure sensing element further includes an upper wall which extends radially inwardly from the tubular wall and which is spaced apart from the bottom wall so as to define a depth of the cavity. The upper wall has at least one trimmer resistor electrically connected to the at least one resistor formed on the bottom wall.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
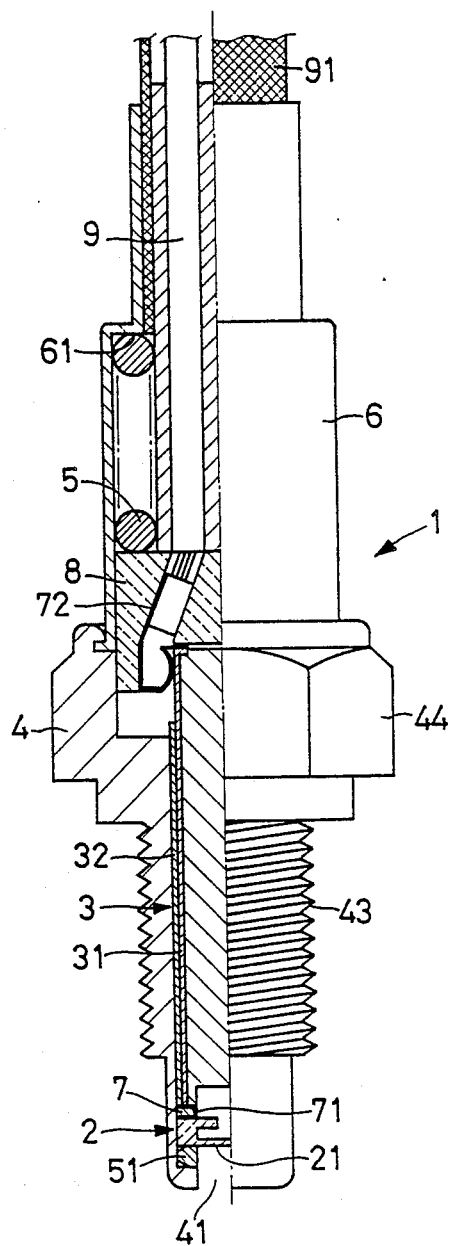
FIG. 1 is an elevational view partly in cross section of one embodiment of a pressure sensor of the present invention.
Figure 6:
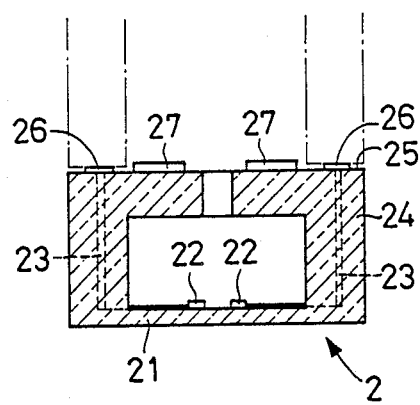
FIG. 6 is a cross sectional view of a pressure sensing element of the pressure sensor of FIG. 1.

Referring first to FIG. 1, a presently preferred embodiment of the pressure sensor of the invention is generally indicated at 1. The pressure sensor 1 incorporates a ceramic pressure sensing element 2, which has an internal cavity as indicated in FIG. 6. The pressure sensing element 2 is disposed in an opening formed in a pressure sensing end portion of a metal housing 4 of the pressure sensor 1.

As most clearly shown in FIG. 6, the pressure sensing element 2 of the instant pressure sensor 1 includes a diaphragm portion 21. This diaphragm portion 21 forms a bottom wall of the sensing element 2. On an inner surface of the diaphragm portion 21, there are formed four resistors 22. These resistors 22 are electrically connected to electrically conductive paths 23 formed through a cylindrical wall 24 of the sensing element 2. The electrically conductive paths 23 are connected to electrodes 26 formed on an end face 25 of the cylindrical wall 24 remote from the diaphragm portion 21. The diaphragm portion 21 is formed by firing a green sheet of a suitable known ceramic material such as alumina, zirconia or mullite, and forming on the fired ceramic sheet the resistors 22 and the electrical leads, by screen printing using an electrically conductive/resistive material such as platinum, gold, silver or palladium. The thus prepared diaphragm portion 21 is bonded by a glass or other bonding agent to the separately fired cylindrical wall 24. Alternatively, the sensing element 2 may be produced by co-firing an unfired laminar structure which includes a ceramic green sheet for the diaphragm portion 21, an unfired array of the resistors 22 formed by screen printing of the selected electrically conductive/resistive material indicated above, and an unfired ceramic body for the cylindrical wall 24. The co-fired sensing element 2 produced by the latter method is particularly preferable from the standpoint of miniaturization and pressure resistance.

It is also preferable that the pressure sensing element 2 be fixed in the opening 41 of the metal housing 4 such that the diaphragm portion 21 is forced at its outer peripheral part against the appropriate bearing surface of the metal housing 4, via a washer 51, as shown in FIG. 1. To this end, a retainer member 3 is disposed in the metal housing 4, such that the pressure sensing element 2 is pressed at its end face 25 by the retainer member 3.

Figure 2:
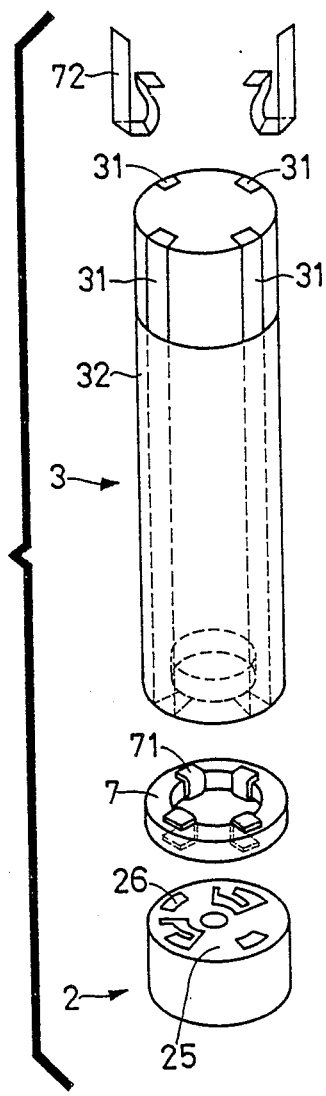
FIG. 2 is a fragmentary exploded perspective view showing a part of the pressure sensor of FIG. 1.

Referring to FIG. 2, the retainer member 3 consists of a columnar body of a ceramic, glass or other ceramic material, four electrically conductive strips 31 formed on the surface of the columnar body, and an insulating layer 32 which covers the electrically conductive strips 31 except for their upper end portions and lower ends. The columnar body may be formed of a metallic material. In this case, the surface of the metallic columnar body is coated with a suitable insulating material before the electrically conductive strips 31 are formed. As shown in FIG. 2, the strips 31 extend in the longitudinal direction of the columnar body and are spaced apart from each other in the circumferential direction. The insulating layer 32 is provided to prevent short-circuiting between the metal housing 4 and the electrically conductive strips 31. The strips 31 are formed by a suitable technique such as a thick-film forming method, by using a metal such as nickel, tungsten, molybdenum and platinum, which has a high value of electrical conductivity. The insulating layer 32 is formed of a ceramic material, glass, polyimide, or a heat-resistant resin such as silicone.

Between the pressure sensing element 2 and the lower end of the retainer member 3, there is disposed an insulating ring 7 for electrical connection between the electrodes 26 and the lower ends of the electrically conductive strips 31 on the retainer member 3. The insulating ring 7 has four circumferentially spaced-apart U-shaped metal pieces 71 at its inner periphery, so that the electrodes 26 and the electrically conductive strips 31 contact with the U-shaped metal pieces 71. The lower end portion of the retainer member 3 is formed with a cylindrical recess concentric with the circumferential surface, so that the annular end face of the retainer member 3 forces the insulating ring 7 against the end face 25 of the cylindrical wall 24 of the pressure sensing element 2.

The metal housing 4 houses the ceramic pressure sensing element 2 and the retainer member 3 in its pressure sensing end portion adjacent to the opening 41. The metal housing 4 has a threaded portion 43, and a head portion 44 having a hexagonal or other polygonal shape. The metal housing 4 is threaded at its threaded portion 43 to an outer wall of a combustion chamber of an internal combustion engine, with a wrench engaging the head portion 44.

Figure 3:
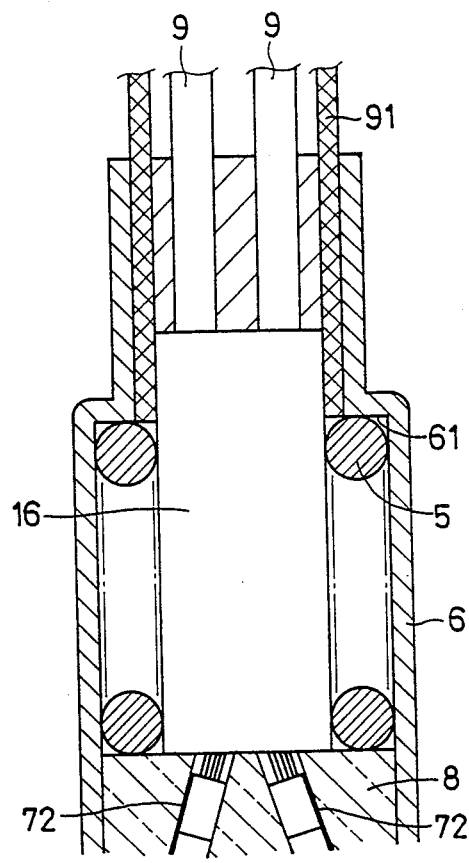
FIG. 3 is a fragmentary elevational view in cross section of another part of the pressure sensor of FIG. 1.

As shown in FIGS. 2 and 3, metal contacts 72 are disposed such that one end of each contact 72 is held in resiliently pressed contact with the upper end of the corresponding electrically conductive strip 31 on the retainer member 3, while the other end of the contact 72 is calked to a corresponding electrical lead wire 9. The lead wires 9 are directed to a suitable power source (not shown) for the sensing element 2 and a signal processing circuit (not shown).

Figure 10:
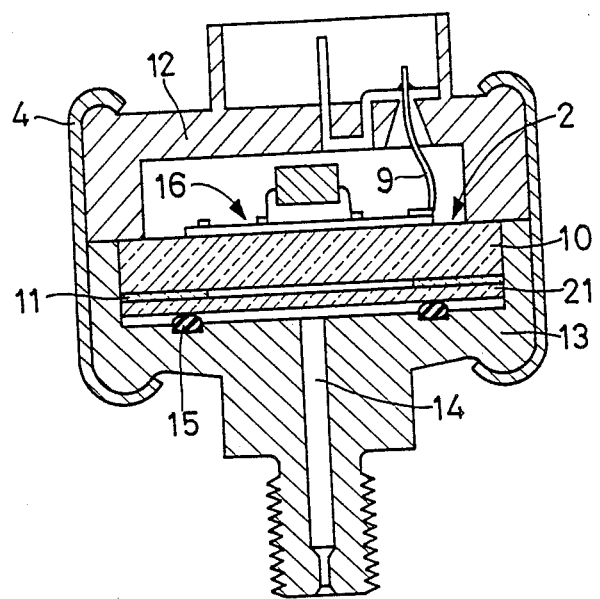
FIG. 10 is an elevational view in cross section of a known pressure sensor.

As shown in FIGS. 1 and 3, a socket 8 is disposed between the metal housing 4 and the retainer member 3. The socket 8 transmits a force of a coil spring 5 to the retainer member 3, to force the retainer member 3 against the sensing element 2 via the insulating ring 7, as described later in detail. The socket 8 is formed of a ceramic material, glass or a hard plastic material, so that the socket 8 can transmit the force of the spring 5 to the retainer member 3. The metal contacts 72 and the terminal portions of the lead wires 9 are fixedly accommodated within the socket 8. The socket 8 further functions to insulate the metal contacts 72 and the lead wires 9 from the metal housing 4. As indicated in FIG. 3, the signal processing electronic circuit 16 as illustrated in FIG. 10 is connected between the metal contacts 72 and the lead wires 9. That is, the electronic circuit 16 is positioned a considerably large distance away from the pressure sensing element 2 which is exposed to a high-temperature fluid whose pressure is to be measured by the instant pressure sensor 1. Accordingly, the electronic circuit 16 is not adversely affected by the temperature of the fluid.

As indicated above, the socket 8 is biased at its upper end face by biasing means in the form of the coil spring 5 which surrounds the path of the lead wires 9. The coil spring 5 is accommodated in a metal cap 6, which is calked at its one end to the metal housing 4. The metal cap 6 has a shoulder portion 61 which bears the end of the coil spring 5 remote from the socket 8. In this arrangement, the elastic biasing force of the coil spring 5 is imparted to the sensing element 2 via the socket 8, retainer member 3 and insulating ring 7, whereby the sensing element 2 is forced against the appropriate surface which partially defines the opening 41 of the metal housing 4.

The end portion of the metal cap 6 remote from the socket 8 surrounds a lower end portion of a shielding tube 91 through which the lead wires 9 extends. The shielding tube 91, which is formed of a net of metal wire, for example, is provided to prevent the lead wires 9 from picking up electrical noises.

Figure 4:
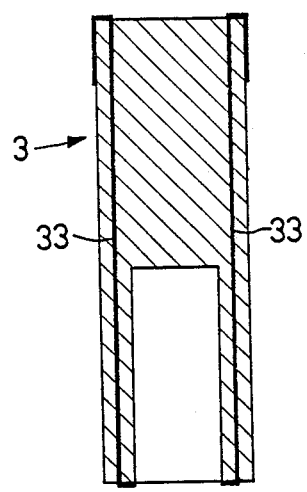
FIG. 4 is an elevational view in cross section of a retainer member used in a modified embodiment of the invention.

It will be understood that the pressure sensor according to the present invention is not limited to the pressure sensor 1 which has been described. For example, the retainer member 3 may be formed with electrically conductive wires 33 which extends through an electrically insulating columnar body, as shown in FIG. 4. In this case, through-holes are formed through the columnar body, and the through-holes are filled with a paste of a powdered electrically conductive material such as nickel, silver or platinum. The conductive wires 33 are formed by firing the masses of the paste in the through-holes. Alternatively, a ceramic powder is compacted around wires of a metal such as tungsten, molybdenum, nickel or platinum to form a columnar body. The obtained wire-embedded body is heated to sinter the ceramic powder.

Figure 5:
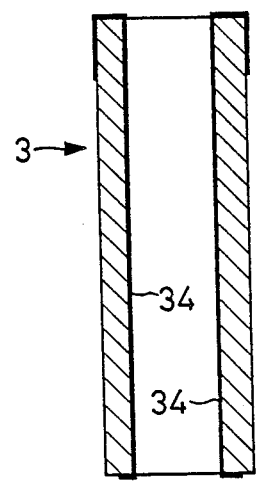
FIG. 5 is an elevational view corresponding to that of FIG. 4, showing a retainer member used in a further modified embodiment of the invention.

Further, the retainer member 3 may be a tubular member which has electrically conductive strips 34 formed on its inner circumferential surface, as illustrated in FIG. 5.

Figure 7:
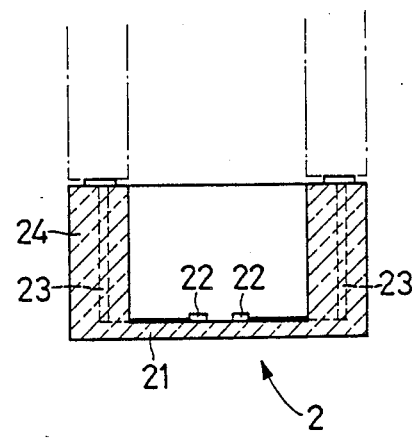
FIG. 7 is a cross sectional view of a modified pressure sensing element used in a further embodiment of the invention.

The pressure sensing element 2 is preferably provided with trimmer resistors 27 formed on an outer surface of an annular upper wall which extends radially inwardly from the upper end of the cylindrical wall 24, as indicated in FIG. 6. The upper wall is spaced apart from the diaphragm portion 21 so as to define a depth of the cavity formed in the sensing element 2. The trimmer resistors 27 are positioned so as to avoid their contact with the end of the retainer member 3. In this arrangement, the resistance of the bridge resistors 22 formed on the diaphragm portion 21 may be suitably adjusted by the trimmer resistors 27, whereby the measuring accuracy of the sensing element 2 is improved. The resistors 22 are connected in a bridge configuration known in the art, such as a Wheatstone bridge circuit. The resistance values of the resistors 22 vary with a change in the pressure to be sensed. The bridge circuit produces an output signal representative of the pressure. The zero point of the output of the bridge circuit and the sensitivity of the circuit may be adjusted by adjusting the trimmer resistors 27. If the trimmer resistors 27 are not necessary, the sensing element 2 may be constructed in the form of a cup-shape body as illustrated in FIG. 7.

While the resistors 22 are preferably formed on the inner surface of the diaphragm portion 21 not exposed to the subject fluid where the fluid contains a corrosive solid component or soot, the resistors 22 may be formed on the outer surface of the diaphragm portion 21 exposed to the fluid, depending upon the subject fluid, or if the resistors 22 are made of a composition selected with considerations given to the heat resistance, corrosion resistance, and temperature coefficient of resistance.

Figure 8A:
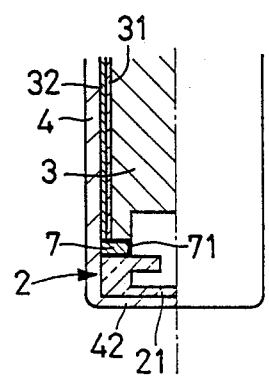
FIG. 8(a) is an elevational view partly in cross section of a sensing portion of a pressure sensor according to still a further embodiment of the invention.

In the embodiment of FIG. 1, the sensing element 2 is disposed in the opening 41 of the metal housing 4 such that the diaphragm portion 21 is directly exposed to the subject fluid. However, it is possible that the sensing end portion of the metal housing 4 has a closed bottom wall 42 made of a suitable metal such as stainless steel, as illustrated in FIG. 8(a). This bottom wall 42 serves as a metallic diaphragm which is adapted to be deformed with the diaphragm portion 21 of the sensing element 2 accommodated in the sensing end portion of the metal housing 4.

Figure 8B:
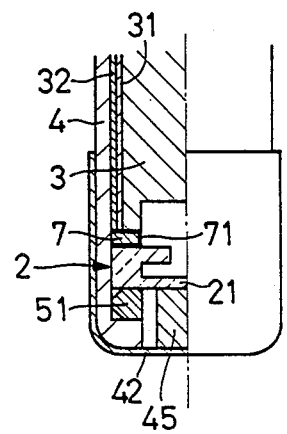
FIG. 8(b) is an elevational view partly in cross section of a portion of a pressure sensor according to yet a further embodiment of the invention.
Figure 9:
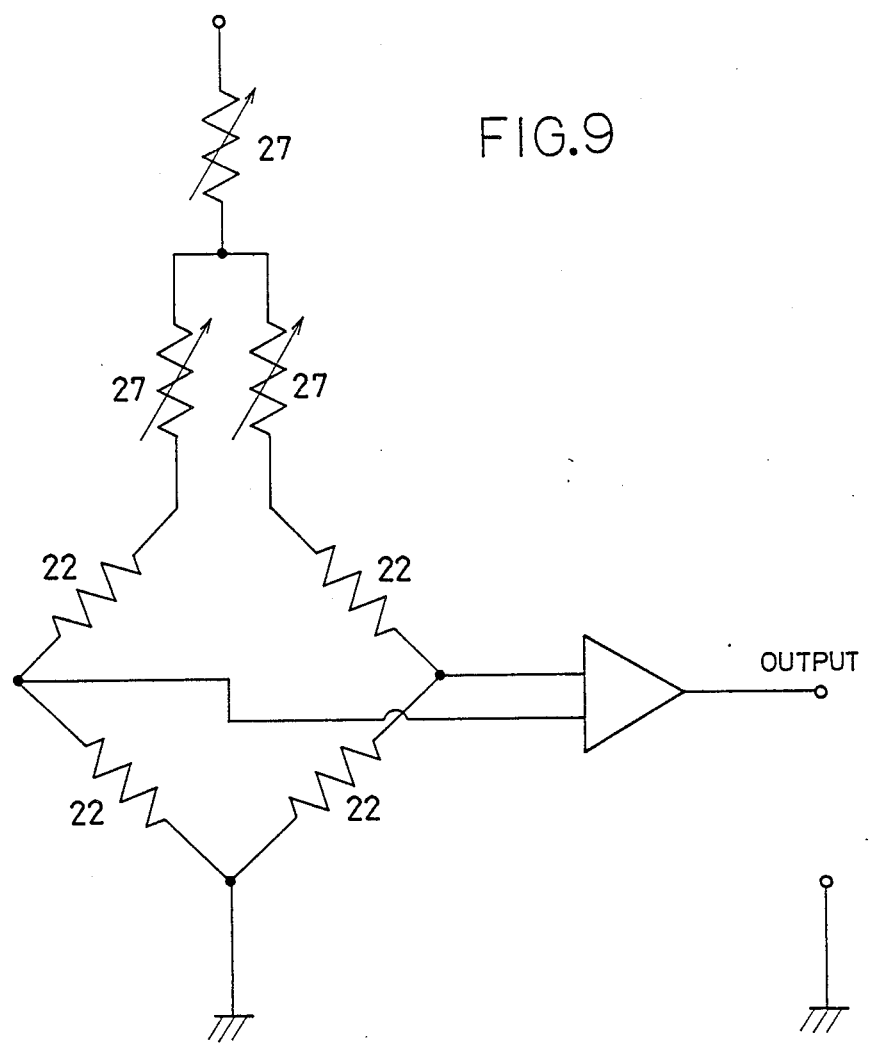
FIG. 9 is a diagram illustrating an example of a bridge circuit formed on the pressure sensing element.

A modification of the embodiment of FIG. 8(a) is illustrated in FIG. 8(b), wherein a displacement transmitting rod 45 is interposed between the metallic diaphragm 42 and the sensing element 2, so that the metallic diaphragm 42, rod 45 and ceramic diaphragm portion 42 are displaced or deformed as a unit.

As described above, the pressure sensor according to the present invention is characterized in that the sensor is not provided with a pressure hole as provided in the known sensor, and that the ceramic pressure sensing element has a diaphragm portion which is adapted to be directly responsive to a change in the pressure of the subject fluid outside the sensing element.

Although the embodiment of FIG. 1 uses the coil spring 5 as biasing means for forcing the sensing element 2 against the appropriate surface of the opening 41 of the metal housing 4, other types of biasing means may be used in place of or in addition to the coil spring 5. Further, the metal cap 6 is modified so as to provide a spring portion which exerts a resilient force on the sensing element 2.

It will be understood that the invention may be embodied with various other changes, modifications and improvements, which may occur to those skilled in the art without departing from the spirit and scope of the invention defined in the following claims.

What is claimed is:

1. A pressure sensor comprising:
   a ceramic pressure sensing element including a bottom wall serving as a diaphragm, and a tubular wall which extends from a periphery of said bottom wall and cooperates with the bottom wall to define a cavity, said diaphragm having at least one resistor formed thereon;
   electrically conductive means electrically connected to said ceramic pressure sensing element;
   a retainer member for supporting at least a portion of said electrically conductive means and holding said ceramic pressure sensing element such that one end of said retainer member is aligned with an end face of said tubular wall remote from said bottom wall, such that said electrically conductive means is in electrical contact with said sensing element;
   a housing accommodating said ceramic pressure sensing element and said retainer member; and
   biasing means associated with the other end of said retainer member, for biasing said retainer member toward said ceramic pressure sensing element, to exert a retaining force to said sensing element and thereby hold the sensing element in said housing.

2. A pressure sensor according to claim 1, wherein said at least one resistor comprises a plurality of resistors which are connected in a bridge configuration.

3. A pressure sensor according to claim 1, wherein said at least one resistor is formed on an inner surface of said bottom wall which partially defines said cavity.

4. A pressure sensor according to claim 1, wherein said biasing means comprises a coil spring.

5. A pressure sensor according to claim 1, further comprising a cap fixed at one end thereof to said housing, said biasing means being disposed in said cap.

6. A pressure sensor according to claim 5, further comprising a socket disposed in said cap between said retainer member and said biasing means such that a biasing force of said biasing means is transmitted to said pressure sensing element via said socket and said retainer member.

7. A pressure sensor according to claim 1, wherein said pressure sensing element is disposed in one of opposite longitudinal end portions of said housing such that an outer surface of said bottom wall remote from cavity is exposed to a fluid whose pressure is sensed by said pressure sensing element.

8. A pressure sensor according to claim 1, wherein said pressure sensing element is disposed in one of opposite longitudinal end portions of said housing, said one longitudinal end having an end wall, said end wall being exposed to a fluid whose pressure is sensed by said pressure sensing element, said bottom wall as said diaphragm being positioned relative to said end wall of said housing such that said bottom wall is displaceable together with said end wall in response to a change in a pressure of said fluid.

9. A pressure sensor according to claim 8, wherein said bottom wall of said pressure sensing element is held in contact with said end wall of said housing.

10. A pressure sensor according to claim 8, further comprising a transmission member interposed between said bottom wall of said pressure sensing element and said end wall of said housing, said transmission member transmitting a displacement of said end wall to said bottom wall as said diaphragm.

11. A pressure sensor according to claim 8, wherein said electrically conductive means comprises electrically conductive members formed on said retainer member and electrically connected to said at least one resistor.

12. A pressure sensor according to claim 11, wherein said retainer member comprises a columnar body, and said electrically conductive members comprise strips formed on an outer circumferential surface of said columnar body such that said strips extend in a longitudinal direction of said columnar body.

13. A pressure sensor according to claim 11, wherein said retainer member has through-holes formed therethrough in a longitudinal direction, said electrically conductive members filling said through-holes.

14. A pressure sensor according to claim 11, wherein said retainer member comprises a tubular member having a bore formed therein, said electrically conductive members being formed on an inner circumferential surface which defines said bore.

15. A pressure sensor according to claim 1, wherein said electrically conductive means comprises electrically conductive paths formed through said tubular wall.

16. A pressure sensor according to claim 1, wherein said electrically conductive means comprises electrode means electrically connected to said at least one resistor.

17. A pressure sensor according to claim 1, further comprising an insulating ring interposed between said pressure sensing element and said one end of said retainer member, said electrically conductive means comprising metal pieces which are fixed on said insulating ring and which are electrically connected to said at least one resistor.

18. A pressure sensor according to claim 1, wherein said pressure sensing element further includes an upper wall which extends radially inwardly from said tubular wall and which is spaced apart from said bottom wall so as to define a depth of said cavity.

19. A pressure sensor according to claim 18, wherein said upper wall has at least one trimmer resistor electrically connected to said at least one resistor formed on said bottom wall.

20. A pressure sensor according to claim 1, wherein said at least one resistor formed on said bottom wall consists of four resistors which are connected in a Wheatstone circuit.

21. A pressure sensor comprising:
   a ceramic pressure sensing element including a bottom wall serving as a diaphragm, and a tubular wall which extends from a periphery of said bottom wall and cooperates with the bottom wall to define a cavity, said diaphragm having at least one resistor formed thereon;
   a retainer member for holding said ceramic pressure sensing element such that one end of said retainer member is aligned with an end face of said tubular wall remote from said bottom wall;
   a housing accommodating said ceramic pressure sensing element and said retainer member; and
   biasing means associated with the other end of said retainer member, for biasing said retainer member toward said ceramic pressure sensing element, to thereby exert a retaining force for forcing said sensing element against said housing, whereby said sensing element and said retainer member are held in said housing.

22. A pressure sensor according to claim 21, further comprising electrically conductive means and wherein said ceramic pressure sensing element comprises a plurality of resistors connected to said electrically conductive means, said retainer member supporting at least a portion of said electrically conductive means such that the electrically conductive means is in electrical contact, at said one end of said retainer member, with said plurality of resistors.

23. A pressure sensor according to claim 22, further comprising a socket through which a biasing force of said biasing means is transmitted to said retainer member and said ceramic pressure sensing element, said electrically conductive means extending through said socket.

* * * * *